United States Patent [19]
Azamar et al.

[11] Patent Number: 5,435,882
[45] Date of Patent: Jul. 25, 1995

[54] DIRECT DRIVE APPLICATOR FOR FOIL PRINTING

[75] Inventors: Ernesto Azamar; Timothy Wehrfritz; Alberto Flores, all of El Paso, Tex.

[73] Assignee: Mark McKeller, Athens, Ga.

[21] Appl. No.: 359,341

[22] Filed: Dec. 19, 1994

Related U.S. Application Data

[63] Continuation of Ser. No. 11,330, Jun. 29, 1993, abandoned.

[51] Int. Cl.⁶ ............................................. B32B 31/00
[52] U.S. Cl. ...................................... 156/359; 156/233; 156/234; 156/583.1
[58] Field of Search .............. 156/230, 233, 234, 359, 156/361, 540, 541, 583.1, 584; 358/296, 300, 302, 303

[56] References Cited

U.S. PATENT DOCUMENTS

| | | | |
|---|---|---|---|
| 4,387,000 | 6/1983 | Tancredi | 156/495 |
| 4,642,659 | 2/1987 | Nagashima et al. | 346/76 PH |
| 4,716,435 | 12/1987 | Wilson | 100/281 |
| 4,724,026 | 2/1988 | Nelson | 156/233 |
| 4,760,467 | 7/1988 | Marazzi et al. | 358/303 |
| 4,802,949 | 2/1989 | Mitsam | 156/540 |
| 4,866,539 | 9/1989 | Marazzi et al. | 358/303 |
| 4,902,546 | 2/1990 | White | 156/233 |
| 4,904,334 | 2/1990 | Honma et al. | 156/540 |
| 5,275,684 | 1/1994 | Marazzi et al. | 156/359 |

*Primary Examiner*—James J. Engel
*Attorney, Agent, or Firm*—Hawes & Fischer

[57] ABSTRACT

The direct drive applicator for foil printing of the present invention discloses a light weight, portable, device advantageous in performing foil printing and laminating which is about the size of a type writer, and contains separate speed and temperature controls so that an operator can rapidly adjust the operation of the machine to quickly optimize the printing or laminating characteristics. The inventive machine contains a foil laminate supply reel and foil laminate takeup reel which are properly tensioned to provide an area of foil laminate under tension on both sides of a heated pressure roller to insure that crumpling or wrinkling of the foil laminate does not occur on printing.

9 Claims, 6 Drawing Sheets

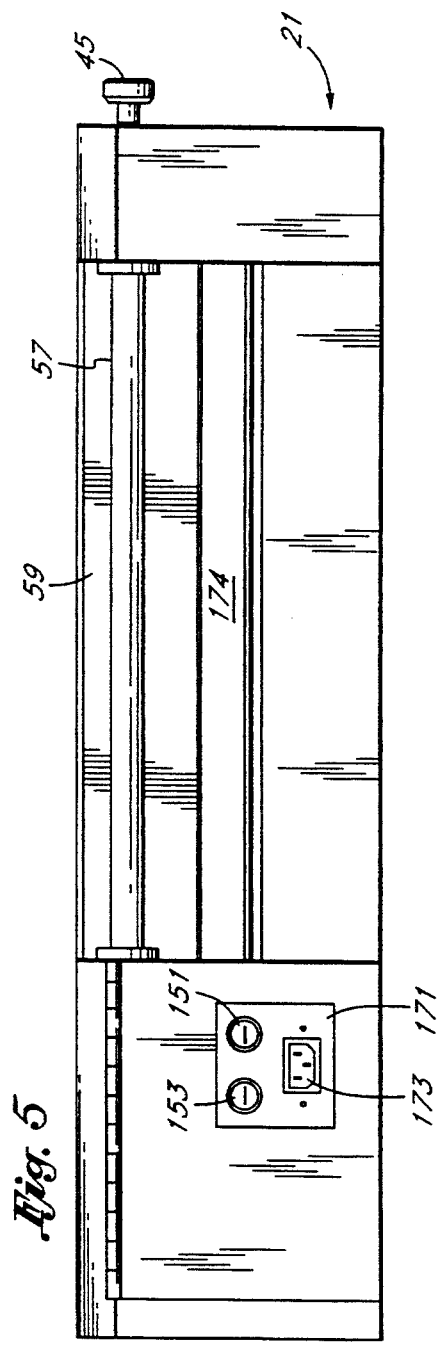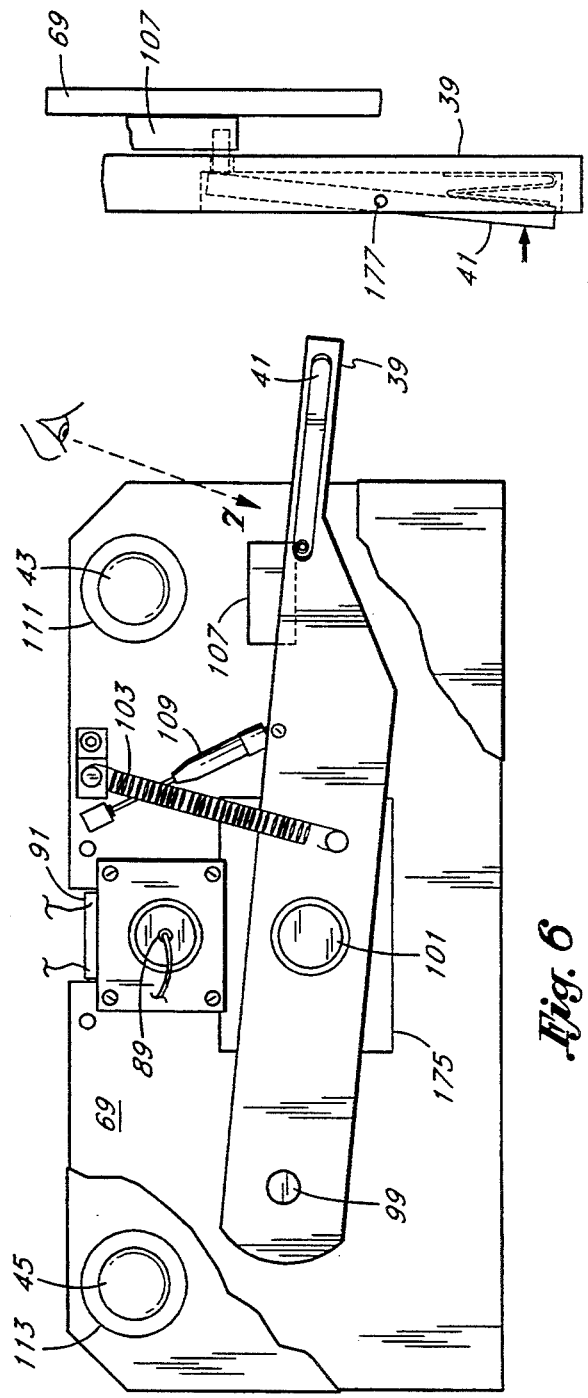

DIRECT DRIVE APPLICATOR FOR FOIL PRINTING

This is a continuation of application Ser. No. 08/011,330 filed on Jan. 29, 1993 now abandoned.

FIELD OF THE INVENTION

The present invention relates to the field of foil printing. More specifically, the present invention relates to an efficient device and system for efficient foiling of paper stock.

BACKGROUND OF THE INVENTION

Foil printing involves a process of bringing an adhesive backed foil into contact, typically with a xeroxographically impregnated paper, under conditions of heat and pressure. The adhesive backed foil selectively adheres to the xeroxographically impregnated portions of the paper while not adhering to the non-impregnated portions of the paper.

For professional, commercial printing operations, a number of devices and machines have heretofore been formulated. For example, U.S. Pat. No. 4,902,546 entitled "Transfer Metallization Laminate" issued on Feb. 20, 1990 to David J. White discloses a method and apparatus for metallization of support members such as paper sheeting. A foil layer is supported by an overlying carrier and has a thermoplastic layer of, for example, styrene butadiene and a viscosity modifier. The compression of the carrier-foil-thermoplastic layer onto a paper layer, accompanied by heat, causes the foil to be removed from the carrier-foil-thermoplastic layer and onto the paper layer. U.S. Pat. No. 4,724,026 entitled "Process for Selective Transfer of Metallic Foils to Xerographic images" issued on Feb. 9, 1988 to Marshal A. Nelson discloses a method for selective metalization of xerographic impregnated sheeting. Heat and pressure is applied to a composite layer formed over a xerographic layer attached to paper. The composite layer includes an adhesive in contact with the xerographic material, a primer, a layer of foil, a release coat, and a carrier polymer film. The transfer composite layer is stripped away to reveal a decorated, foiled paper sheet.

Large, expensive devices capable of being utilized to practice foil metalization, especially the selective metalization described in the Nelson '026 patent, began to be formulated in the mid-80's. For example U.S. Pat. No. 4,760,467 entitled "Composing System Including A Foil Printing Unit" filed Nov. 25, 1986 and issued on Jul. 26, 1988 to Giancarlo Marazzi and Pierre Saez, and a later filed U.S. Pat. No. 4,866,538 entitled "Composing System Including A Foil Printing Unit" filed Jul. 22, 1988 and issued on Sep. 12, 1989 to Giancarlo Marazzi and Pierre Saez, both disclose a computerized composing system including a color transfer unit for selectively coloring portions of the printed output.

This device contains a keyboard, computer monitor, operator workstation, and cabinet containing a laser printer and color transfer unit. The system was quite large and occupied the space of about 1½-2 desk spaces or larger. The device disclosed is replete with logic circuitry and really describes an automated printing station.

However, in the commercial printing industry, the ability to be flexible and to offer a wide variety of products can spell the difference between success and failure. For example, the cost of the Marazzi device is several thousand dollars, and the device is somewhat limited in the tasks that it can perform. A printer who chose to invest significantly in one device to perform a particular type of printing would be limited to the features of the machine which held the bulk of his investment. Bulky investment in a variety of similarly high cost machines, in an attempt to offer the flexibility now demanded from practitioners of the printing industry, could spell the difference between survival and bankruptcy.

Even in the instance of survival, profitability would be severely curtailed. Further, there is the issue of physical bulk. Several devices of the type described in the Marazzi references would each consume several hundred square feet of operating area. In today's tight business climate, and with business floor footage valued at a premium, such bulky devices can be more of a liability than an asset.

Further, the question of operability and complexity come into play. A large complex machine, and especially a costly one, requires a skilled operator. Skilled operators require an inordinate amount of time and investment and labor cost. Re-training new operators where employee turnover is high can cause a business to lose profit rapidly. Having a high cost device and high cost labor will generally mean that a business must have at least a whole eight hour shift of needed printing on a weekly basis, indefinitely, if the cost of investing in the device and necessary personnel can be justified.

However, due to advances in technology, keen competition in printing, and the other cost factors recited above, the large devices as described in Marazzi are, with the exception of round the clock "full on" printing operations, going the way of the dinosaur. The printing industry of today demands cost efficient, small, easy to use, and flexible machinery which can serve more than one purpose.

SUMMARY OF THE INVENTION

The direct drive applicator and method for foil printing of the present invention discloses a light weight, portable, device advantageous in performing foil printing and laminating. The device is about the size of a typewriter, and contains separate speed and temperature controls so that an operator can rapidly adjust the operation of the machine to quickly optimize the printing or laminating characteristics.

The inventive machine contains a foil laminate supply reel and foil laminate takeup reel which are properly tensioned to provide a taught foil area on both sides of a heated pressure roller to insure that crumpling or wrinkling of the foil laminate does not occur on printing. The pressure mechanism is designed so that foil is transported through the machine only when under operation so that foil laminate will be conserved. An integral lock handle and shock absorber provides a relatively wide range of thicknesses over which the proper compression of the roller can take place upon material to be treated with the device.

This wide range of operation will permit the foiling of very thin or very thick pieces of paper stock and other substrates, and will permit the lamination of thick materials with even thicker plastic encasing layers. For example, the range of paper weights utlizable with the device of the present invention ranges from eighteen pound (18#) text weight paper through one hundred ten pound (110#) cover weight paper.

BRIEF DESCRIPTION OF THE DRAWINGS

FIG. 5 is a rear view of the direct drive applicator shown in FIGS. 1-4;

FIG. 6 is a left side view of the direct drive applicator taken along line 6—6 of FIG. 2;

FIG. 7 is a top view detail of the engagement handle shown in FIG. 6;

DETAILED DESCRIPTION OF THE PREFERRED EMBODIMENT

Figure 1:
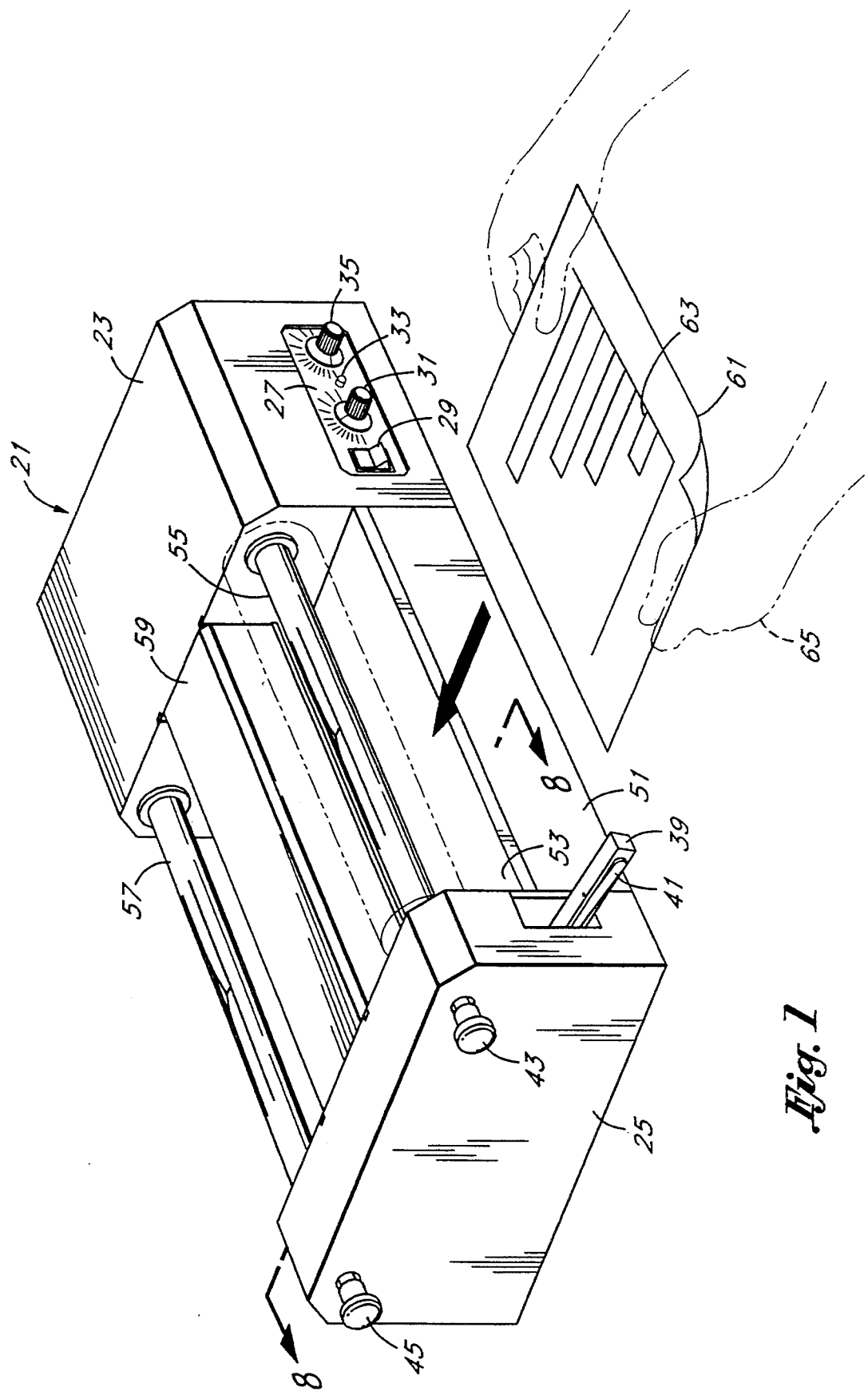
FIG. 1 is a front perspective view of the direct drive applicator of the present invention for practicing the inventive method of the present invention.

Referring to FIG. 1, a perspective of the direct drive applicator of the present invention and which is useful for practicing the method for foil printing of the present invention, is shown. The applicator is indicated as applicator 21 and includes a right side housing cover 23 and a left side housing cover 25.

The right side housing cover 23 defines a panel area 27 which further includes an on/off switch 29, a hot roller heat control 31, a pilot or on/off indicator light 33, and a roller speed control 35. The left side housing cover 25 defines access to a pressure roller engagement handle 39 and its release lever 41, a foil feed roller release pin 43, and a foil takeup roller release pin 45.

The middle section, between the right and left side housing covers 23 and 25 includes a front panel 51, a feeder side base plate 53, a foil feeder supply roller 55, a foil takeup roller 57, and a hot roller cover 59.

Although the foil is not present, the applicator 21 is shown in position to perform the foiling operation. Shown to the right and as will be described later is a sheet of paper to be foiled 61, containing xerographic images 63, and being hand fed by an operator whose hands and arms 65 are illustrated in phantom.

Figure 2:
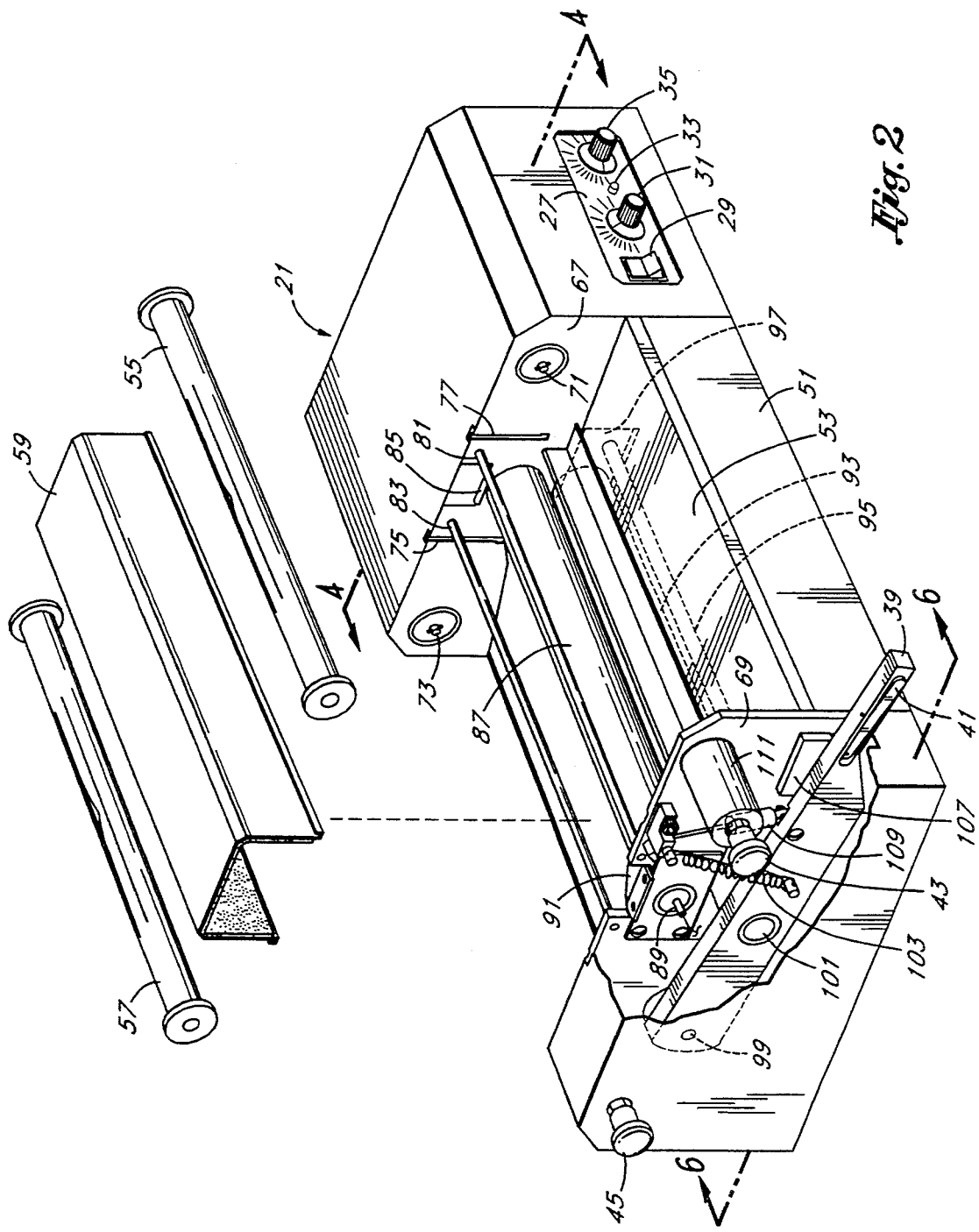
FIG. 2 is a front perspective partially exploded view of the direct drive applicator shown in FIG. 1.

Referring to FIG. 2, the foil feeder supply roller 55, foil takeup roller 57, and hot roller cover 59 have been elevated in an exploded fashion to reveal the details of the left side of the mechanism of the applicator 21. Beginning adjacent the right side housing cover 23, a vertical right side support plate 67 is seen. Similarly, at the left side of the applicator 21, the back portion of a vertical left side support plate 69 is seen. At the right side of the applicator, and supported by right side support plate 67 is a foil supply roller bearing 71 is seen. Similarly, at the rear of the right side housing cover 23, a foil take up roller bearing 73 can be seen.

Nearer the middle of the right side housing cover 23, a pair of guide slots 75 and 77 are vertically oriented to guide the vertical edges of the hot roller cover 59. Between the guide slots 75 and 77 are support rods 81 and 83 which are positioned to structurally reinforce the applicator 21, and which may be positioned to further support the hot roller cover 59. Between the support rods 81 and 83 is a thermal fuse 85. Thermal fuse 85 is a safety feature which enables shutdown of the applicator 21 upon too high a temperature within the confines of the hot roller cover 59. Thermal fuse 85 is located over a hot roller 87.

Hot roller 87 is rotatable but otherwise fixed within the structural framework of the applicator 21. Hot roller 87 is hollow and supports a glass enveloped heating element 89, the end of which can be seen in FIG. 2. Each end of the heating element 89 contains an electrical connection, and the elongate heating element 89 is connected in series with a source of power to provide resistive heating. The temperature is controlled with the use of a thermocouple 91 which can be only partially seen in FIG. 2.

Shown directly beneath the hot roller 87, and in phantom is the pressure roller 93. Immediately adjacent and parallel to the pressure roller 93 and also shown in phantom is a structural member 95. Both structural member 95 and pressure roller 93 attach to and are supported by a support plate 97. A similar support plate is found at the other end of structural member 95 and pressure roller 93, but is not shown in FIG. 2.

This other support plate, again which will be later shown, is attached to the pressure roller engagement handle 39. The complete length of the pressure roller engagement handle 39 is shown, albeit partially in phantom. Engagement handle 39 is pivotally engaged at its far end about a pivot point 99. The pivot point 99 is achieved through a pivot rod 100 which extends across the central portion of the applicator 21 much like structural member 95 except that the pivot rod 100 is pivotally supported within the applicator 21 by structures not shown in the Figures. Nearer its midpoint, the engagement handle 39 pivotally engages the other support plate near a pivot point 101.

Figure 4:
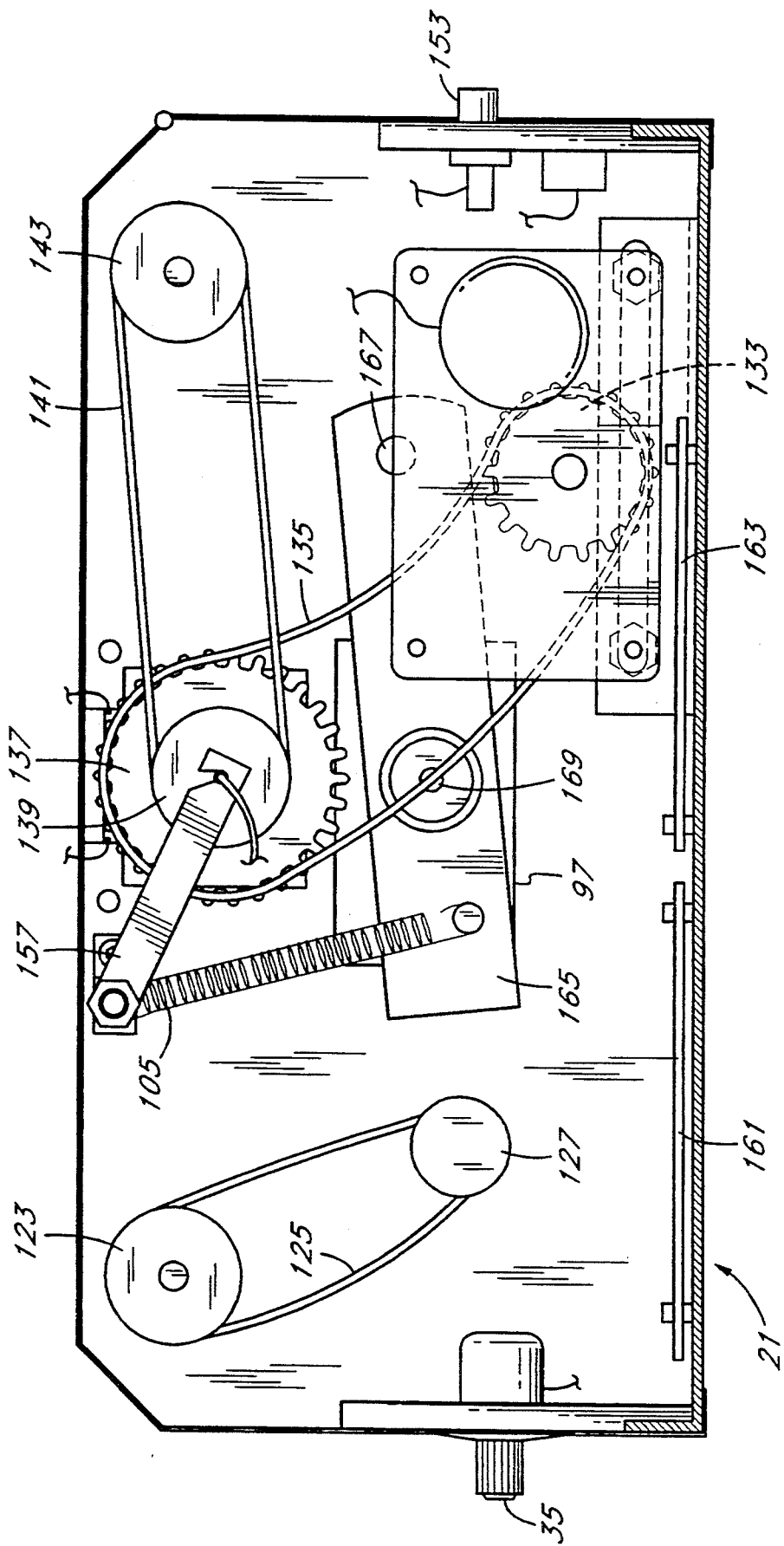
FIG. 4 is a right side view of the direct drive applicator taken along line 4—4 of FIG. 2.

A spring 103 urges the engagement handle 39 upwardly, as does a spring 105, shown in FIG. 4. The springs 103 and 105 both act to supply the force necessary to cause pressure roller 93 to bear against hot roller 87. The engagement handle 39 is actuated by hand, downwardly, against the springs 103 and 105 to a downward locked position. The release lever 41 can then be pressed inwardly toward the engagement handle 39 to cause the engagement handle 39 to become unlocked from its disengaged position to enable the springs 103 and 105 to urge the pressure roller 93 into engagement with the hot roller 87.

Release lever 41 is pivotally mounted within the engagement handle 39 and extends laterally through the engagement handle 39 to a point where it engages a catch structure 107 supported by vertical left side support plate 69. Pivotal movement of the release lever 41 causes its disengagement from the catch structure 107.

Attached between the engagement handle 39 and the vertical left side support plate 69 is a small shock absorber 109. Shock absorber 109 limits the speed with which engagement handle 39 can be upwardly displaced by the springs 103 and 105 upon release by release lever 41. This prevents the pressure roller 93 from "banging" against the hot roller 87.

Also shown for foil feed roller release pin 43 is the spring cylinder 111 from which the pin 43 extends. As will be later shown, this cylinder contains the structure necessary to urge the release pin 43 in the direction of foil supply roller bearing 71, to hold foil feeder supply roller 55 in place.

Figure 3:
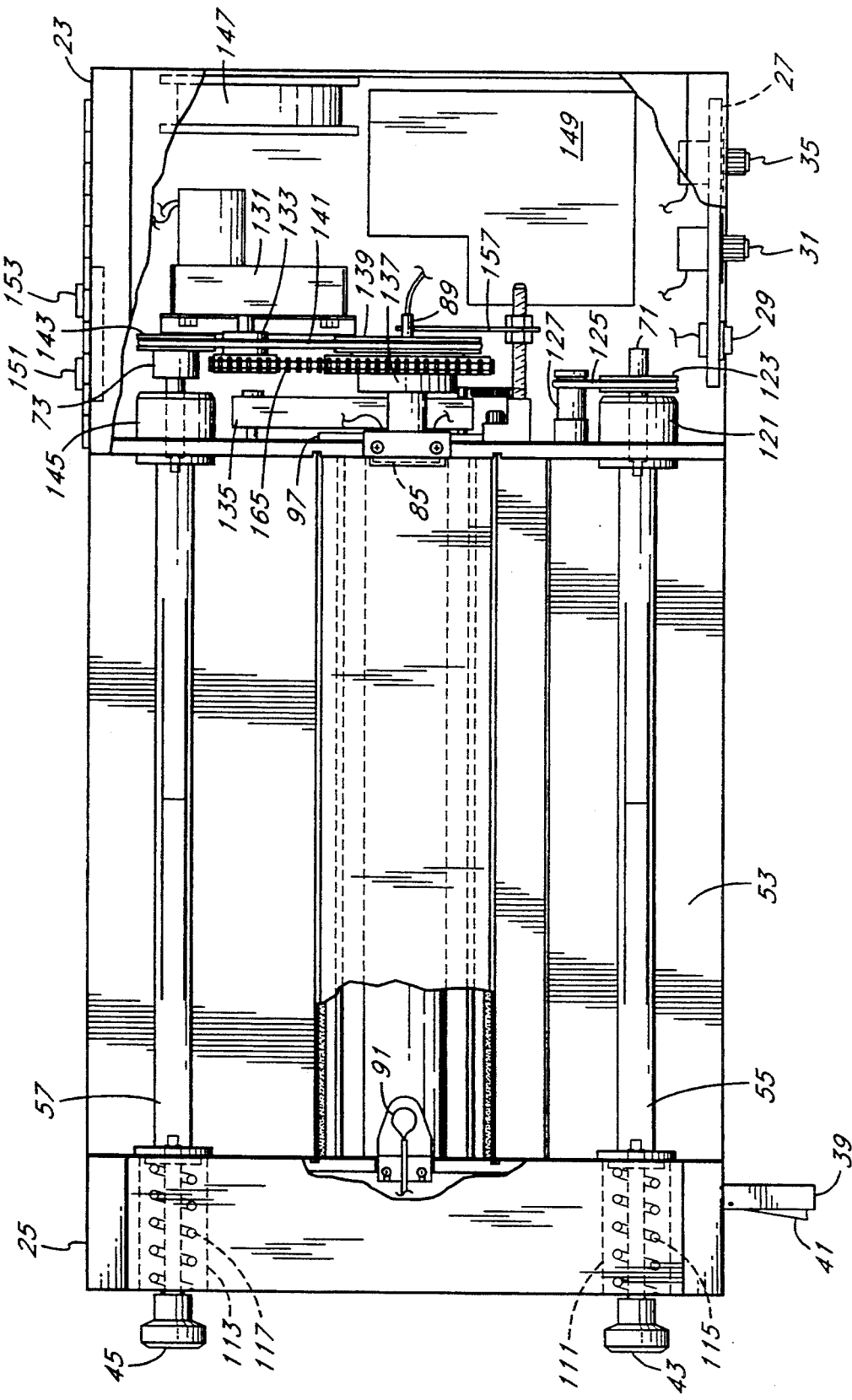
FIG. 3 is a top partially broken away view of the direct drive applicator shown in FIGS. 1 and 2.

Referring to FIG. 3, a top partially broken away view shows greater operational details of the applicator 21. At the left side is shown in phantom a spring cylinder 113 from which the pin 45 extends. Spring cylinder 111 contains a spring 115 while spring cylinder 113 contains a spring 117. Springs 115 and 117 urge the release pins 43 and 45 in the direction of foil supply roller bearing 71 and foil take up roller bearing 73, respectively.

Further details are seen at the right side of the applicator 21. Nearer the front portion of the applicator 21 is a rotational bearing 121 which supports the foil supply roller bearing 71. The end of foil supply roller bearing 71 extending in the direction opposite pin 43 contains a pulley 123. Pulley 123 supports an elastic member 125 encircling a friction post 127. The purpose of this configuration is to provide some turning resistance to the foil supply roller bearing 71 and foil feeder supply roller 55, to insure that the supply of foil, to be shown, is provided under some tension so that it will not wrinkle or jam the applicator 21.

Also shown in FIG. 3 is an electric motor 131 which turns a chain sprocket 133. A chain 135 extends between chain sprocket 133 and main drive sprocket 137. Main drive sprocket 137 also contains a pulley portion 139 which supports a second elastic member 141. Second elastic member 141 provides the structure which enables the main drive sprocket 137 to drive the foil take up roller bearing 73. Foil take up roller bearing 73 also contains a pulley portion 143 which engages the second elastic member 141. Ideally the ratio of the circumference of the pulley portion 139 compared to the pulley portion 143 of bearing 73 should take to account the expected circumference of the foil take up roller 57. Foil take up roller bearing 73 is also surrounded by a rotational bearing 145.

Also visible from the perspective of FIG. 3 is a cooling fan 147 and an electronics and power control section 149. Cooling fan 147 assists in insulating the electronics and power control section 149 from the effects of any residual heat from the glass enveloped heating element 89 and hot roller 87 which may be transmitted within the right side housing cover 23. The electronics and power control section 149 contains all of the electronics and power circuitry necessary to power and control the applicator 21. Typically this will be accomplished from a 115 volt alternating current source.

At the rear of the right side housing cover 23, and protruding rearwardly are a pair of fuse holders 151 and 153. The external mounting of the fuse holders 151 and 153 facilitates the easy changeability of the fuses they contain. Also visible is a support 157 for the glass enveloped heating element 89. The support 157 helps to rotationally secure the heating element 89 against unintentional rotation. Such rotation would tend to cause the electrical connections to wear unduly.

Referring to FIG. 4, a side view of the applicator 21 with the right side housing cover 23 removed, further details of the structure illustrated in FIGS. 1-3 can be seen. In addition to the structures previously described, the electronics and power control section 149 can be seen to contain circuit boards 161 and 163 which bear the electronics (not shown) which are used to power the applicator 21.

Structurally similar to the pressure roller engagement handle 39, is a pressure roller engagement lever 165. Similar to that for the roller engagement handle 39, the pressure roller engagement lever 165 can be seen as having a pivot point 167 which lies on the same axis as the pivot point 99. Similarly a pivot point 169 lies on the same axis as the pivot point 101.

Referring to FIG. 5, a rear view of the applicator 21 again illustrates the fuse holders 151 and 153. They are shown to be supported within a utility area 171 which also contains a power cord connection 173. Also shown is a take up side base plate 174 which overlies the area accommodating the exit of material which will emerge from between the hot roller 87 and the pressure roller 93.

Referring to FIG. 6, a view taken along line 6—6 of FIG. 2 illustrates the detail of the pressure roller engagement handle 39 which was shown in FIG. 2. In addition, a support plate 175 corresponding to the oppositely oriented support plate 97, is now visible. The details of the pressure roller engagement handle 39 are best shown in FIG. 7 which is taken from the visual perspective illustrated in FIG. 6, where a pivot pin 177 can be seen enabling a pivoting motion between release lever 41 and pressure roller engagement handle 39. Shown in phantom is the action of the release lever 41 in its engagement with catch structure 107.

Figure 8:
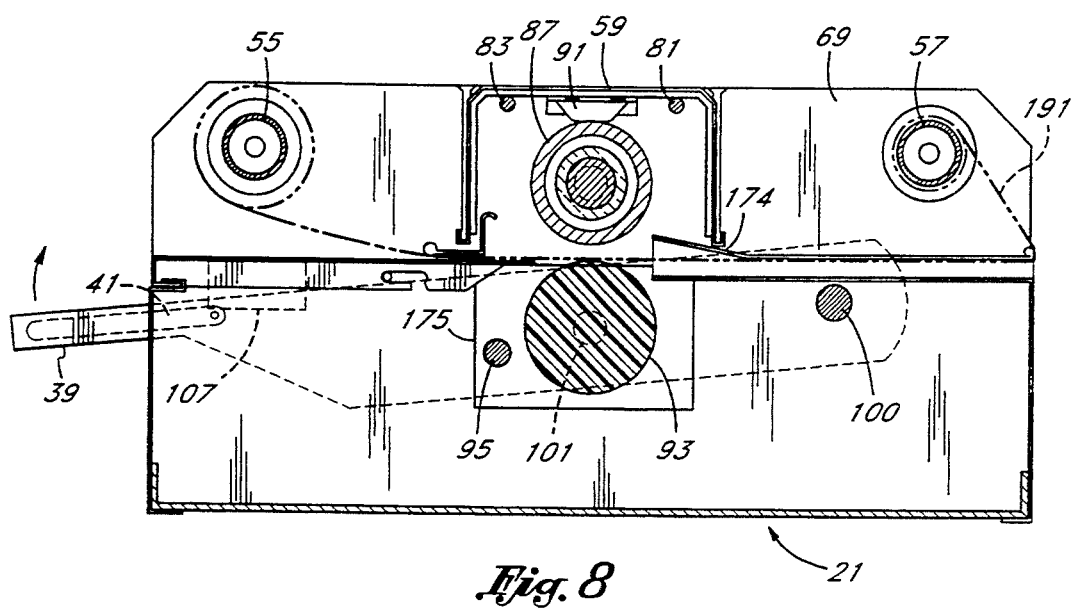
FIG. 8 is a sectional view taken along line 8—8 of FIG. 1 with the rollers of the direct drive applicator in unengaged position.

Referring to FIG. 8, a sectional view taken along line 8—8 of FIG. 1 illustrates the hot roller cover 59, hot roller 87, pressure roller 93, structural member 95, and pivot rod 100 in section, and illustrates the remaining structures with respect to a view from the right side housing cover 23. In FIG. 8, the pressure roller engagement handle 39 is in the downward, non-engaged position, and the pressure roller 93 is shown disengaged from the hot roller 87. Note the position of support plate 175. Note also the presence of the release lever 41 with respect to the catch structure 107, shown in phantom. Note that the presence of a sheet of foil, as it would be if loaded into position on the applicator is shown in dashed line format and labeled as foil 191. Foil 191 is shown extending from the foil feeder supply roller 55, into an area between the rollers, and through a space below take up side base plate 174, and is mounted with the foil side down, for direct metallic contact with the paper stock to be fed into the applicator 21.

Figure 9:
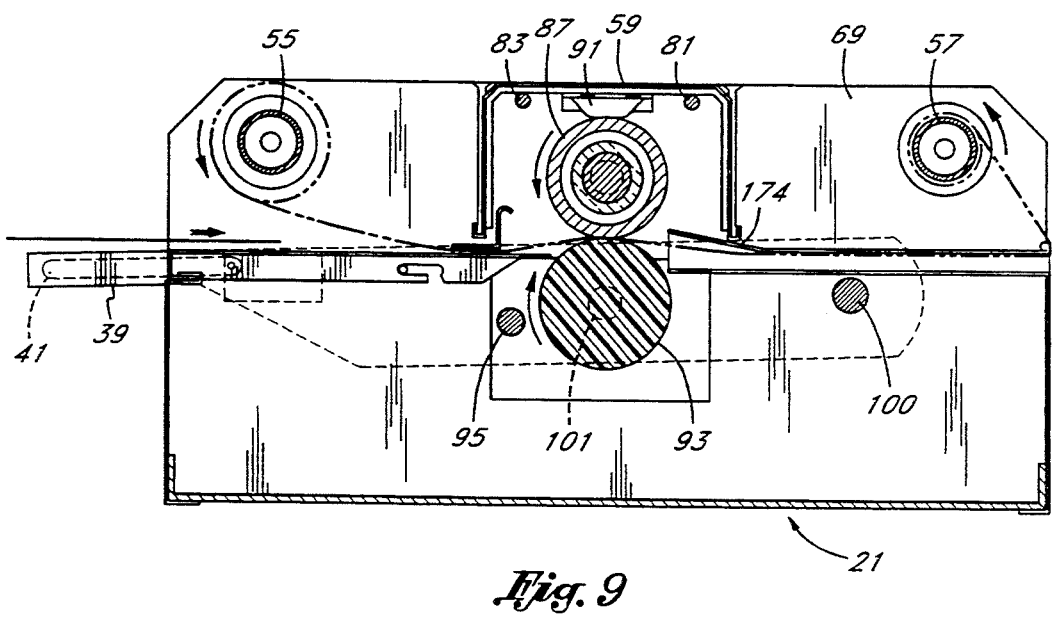
FIG. 9 is a sectional view taken along line 8—8 of FIG. 1 with the rollers of the direct drive applicator in the engaged position.

Referring to FIG. 9, the same sectional view taken along line 8—8 of FIG. 1 is shown, but illustrated with the pressure roller 93 having been brought upwardly into engagement with the hot roller 87. This is accomplished with the disengagement of release lever 41 from the catch structure 107. Upon release, the pressure roller engagement handle 39 is urged upwardly by springs 103 and 105. A switch (not shown) engages the electric motor 131 to begin rotational movement of the hot roller 87. The springs 103 and 105 bring the hot roller 87 into contact with the pressure roller 93, and cause any foil present (shown in dashed line format) to be drawn through the point of contact of the hot roller 87 and the pressure roller 93.

The simultaneous release of the engagement handle and switching on of the motor acts to conserve foil 191. The foil 191 will move through the applicator 21 only when the engagement handle 39 is released. This action conserves foil, since the material to be foiled can be positioned into the applicator up to the point where foiling is to occur before releasing the engagement handle 39. The engagement handle 39 can be re-set at the point where foiling is to cease. Otherwise, the foil supply would run for the whole extent of the document to be foiled.

With the separate speed and temperature controls, the applicator 21 can be optimized for different types of foil 191 and different types of paper stock. Further, the applicator 21 can be utilized without foil 191 for other purposes such as for laminating. The wide separation between the hot roller 87 and the pressure roller 93 when the applicator is not in use permits a wide variety of materials of varying thickness to be placed into the applicator 21. The width of the material is compensated for by the springs 103 and 105, which provide an even pressure between the hot roller 87 and the pressure roller 93.

Turn the applicator 21 on using the on/off switch 29 located at the front of the applicator 21. The hot roller heat control 31 on the front of the applicator 21 regulates the temperature of the hot roller 87. The roller speed control 35 in the controls the speed of the hot roller 87. It is recommended to begin the speed setting at mid-range and the temperature be set at 325° F. for general printing. The applicator 21 should be on for at least 5 minutes before starting operation. The operator may have to increase or lower the temperature depending on the paper stock being used.

A roll of foil is loaded on the foil feeder supply roller 55. The foil feeder supply roller 55 may be released from the applicator 21 by pulling outwardly on foil feed roller release pin 43 until the foil feeder supply roller 55 is released. The end of the foil feeder supply roller 55 is fitted with a removable flange, the flanges shown as a part of the foil feeder supply roller 55 but not shown in detail in the Figures. A new roll of foil is placed over the foil feeder supply roller 55 and the removable flange is replaced. The foil feeder supply roller 55 is replaced onto the applicator 21.

Approximately eight inches of foil is pulled up from the roller and fed into the applicator 21 between the hot roller 87 and pressure roller 93. A piece of card stock may be used as a guide until the foil leader comes through back of the applicator 21. Next, an empty foil core is fitted onto foil take up roller 57 using the same method as used in loading on the foil feeder supply roller. The end of the foil may be taped onto the empty core with the bottom of the foil facing up.

Once the temperature of the applicator 21 reaches 335° F., the rollers may be engaged by releasing the pressure roller engagement handle 39 using the release lever 41. Next the paper or card stock to be foil printed is inserted through the front of the unit and under the foil as it extends between the hot roller 87 and the pressure roller 93. The paper to be printed is gently fed into the applicator 21 until it emerges from the back of the applicator 21. Care should be taken not to allow sheets to overlap their toner images on which foil is to be applied.

Once the last sheet of paper to be foiled has been fed through, turn rollers off by pressing down the pressure roller engagement handle 39 and allowing the release lever 41 to catch to hold the handle 39 in place. The applicator 21 may then be turned off using the on/off switch 29.

To change colors of foil simply cut foil on the foil feeder supply roller 55 lengthwise with a blade and pull the remaining foil through the applicator 21. Remove foil from the foil feeder supply roller 55 and replace with a new color of foil by repeating the installation steps outlined above.

While the present invention has been described in terms of a personal electronics directory, one skilled in the art will realize that the structure and techniques of the present invention can be applied to many appliances. The present invention may be applied in any situation where a computer chip needs to be accessed quickly, without the need for a technician, and without any special tools.

Although the invention has been derived with reference to particular illustrative embodiments thereof, many changes and modifications of the invention may become apparent to those skilled in the art without departing from the spirit and scope of the invention. Therefore, included within the patent warranted hereon are all such changes and modifications as may reasonably and properly be included within the scope of this contribution to the art.

What is claimed:

1. A manually operated, manually activated foil applicator comprising:
    a planar base housing;
    a first and a second side support plate, spaced apart from each other and supported by said planar base housing;
    a first elongate roller rotatably supported between said side support plates and rotatably powered;
    a housing cover, supported by said planar base housing;
    manually controlled heating means for controlling the temperature of said first elongate roller, supported by said housing cover and within said first elongate roller;
    a second elongate roller rotatably supported between said side support plates and pivotally supported at a second axis parallel to said first axis and manually moveable out of engagement and into engagement with said first elongate roller;
    a handle, connected to pivot with said second elongate roller, and extending beyond the limit of said housing cover, for enabling manual pivotally movement of said second elongate roller out of and into engagement with said first elongate roller; and
    catch means, carried partially within said handle, and pivotable with respect to said handle, for locking said handle means into a first position where said second elongate roller is out of engagement with said first elongate roller and for releasing said handle means from said first position and bringing said second elongate roller toward engagement with said first elongate roller.

2. The applicator recited in claim 1 wherein said manually controlled heating means further comprises:
    an electric heat element supported within said first elongate roller; and
    a manual thermostat control supported by said housing cover for controlling the electrical energy delivered to said electric heat element.

3. The applicator recited in claim 1 further comprising:
    a foil supply roll, rotatably supported by said side support plates, for dispensably feeding under tension a supply of foil sheeting between said first and second elongate rollers;
    a foil take up roll, rotatably supported by said side support plates, for taking up said supply of foil sheeting under tension from between said first and second elongate rollers.

4. The applicator recited in claim 2 and further comprising a spring having a first end depending from one of said side support plates and a second end connected to said handle.

5. The applicator recited in claim 1 and further comprising:
- an electric motor, supported by said planar base housing;
- a chain sprocket mechanically connected to said electric motor;
- a main drive sprocket mechanically connected to said first elongate roller; and
- a chain connecting said main drive sprocket and said chain sprocket.

6. The applicator recited in claim 5 and further comprising a manually adjustable electric motor speed control, supported by said housing cover, and electrically connected to said electric motor.

7. The applicator recited in claim 5 and further comprising:
- a pulley portion adjacent said main drive sprocket and mechanically connected to be rotatable with said main drive sprocket;
- a pully mechanically connected to and rotatable with said foil take up roll; and
- an elastic drive member connected between and drivably engaging said pulley portion and said pulley.

8. The applicator recited in claim 1 wherein said housing cover further comprises, a right side housing cover and a left side housing cover spaced apart from said right side housing cover housing and on opposing sides of said first and said second elongate rollers.

9. The applicator recited in claim 8 and further comprising a hot roller cover mounted between said right side housing cover and said left side housing cover and over said first elongate roller.

* * * * *